(12) United States Patent
Rohs et al.

(10) Patent No.: US 7,654,930 B2
(45) Date of Patent: Feb. 2, 2010

(54) CONTINUOUSLY ADJUSTABLE GEAR

(75) Inventors: Ulrich Rohs, Roonstrasse 11, 52351 Düren (DE); Christoph Dräger, Inden (DE); Werner Brandwitte, Langerwehe (DE)

(73) Assignee: Ulrich Rohs, Düren (DE)

( * ) Notice: Subject to any disclaimer, the term of this patent is extended or adjusted under 35 U.S.C. 154(b) by 507 days.

(21) Appl. No.: 10/541,448

(22) PCT Filed: Dec. 17, 2003

(86) PCT No.: PCT/DE03/04165

§ 371 (c)(1),
(2), (4) Date: Mar. 27, 2006

(87) PCT Pub. No.: WO2004/063598

PCT Pub. Date: Jul. 29, 2004

(65) Prior Publication Data

US 2006/0217227 A1  Sep. 28, 2006

(30) Foreign Application Priority Data

Jan. 9, 2003  (DE) .............................. 103 00 311

(51) Int. Cl.
F16H 15/16  (2006.01)
(52) U.S. Cl. .......................................... 476/53; 476/52
(58) Field of Classification Search ................... 476/50, 476/51, 52, 53, 54
See application file for complete search history.

(56) References Cited

U.S. PATENT DOCUMENTS

| 1,709,346 | A |   | 4/1929 | Garrard |
| 1,727,232 | A |   | 9/1929 | Farrell |
| 1,844,239 | A | * | 2/1932 | Boehme et al. ............... 476/48 |
| 3,375,733 | A |   | 4/1968 | Browning |
| 3,739,658 | A |   | 6/1973 | Scheiter |
| 4,238,976 | A |   | 12/1980 | Kemper |
| 6,093,131 | A | * | 7/2000 | Rohs ........................... 476/53 |
| 2005/0164825 | A1 | * | 7/2005 | Reisch ........................ 476/52 |

FOREIGN PATENT DOCUMENTS

| JP | 06174034 | 6/1994 |
| JP | 2000291759 | 10/2000 |
| WO | WO 01/44686 | 6/2001 |

OTHER PUBLICATIONS

International Search Report.

* cited by examiner

*Primary Examiner*—David M Fenstermacher
(74) *Attorney, Agent, or Firm*—Collard & Roe, P.C.

(57) ABSTRACT

Two continuously variable transmission parts are connected to a common driven train through a pick-off gear so as to provide an entire continuously variable transmission operating with high efficiency even at high torques.

20 Claims, 6 Drawing Sheets

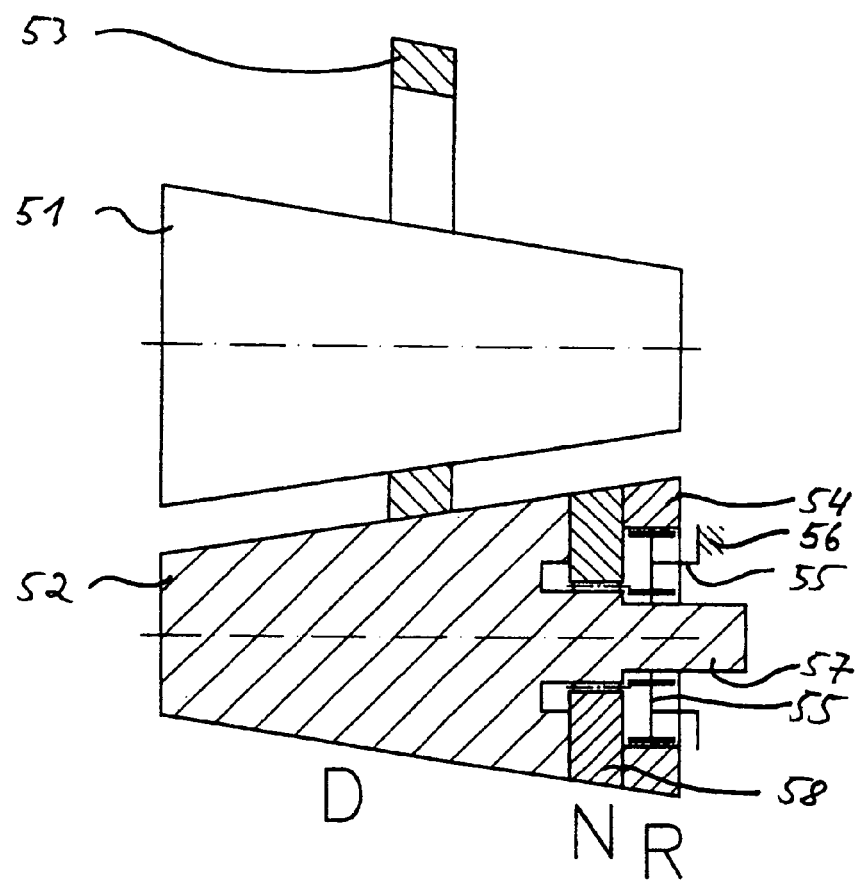

CONTINUOUSLY ADJUSTABLE GEAR

CROSS REFERENCE TO RELATED APPLICATIONS

Applicants claim priority under 35 U.S.C. §119 of German Application No. 103 00 311.8 filed Jan. 9, 2003. Applicants also claim priority under 35 U.S.C. §365 of PCT/DE2003/004165 filed Dec. 17, 2003. The international application under PCT article 21(2) was not published in English.

BACKGROUND OF THE INVENTION

1. Field of the Invention

The invention relates to a continuously variable transmission including two continuously variable transmission parts that are parallely disposed in a gear train.

2. Prior Art

Such a transmission is known from U.S. Pat. No. 1,709,346 for example, a central bevel gear being driven in these arrangements, said central bevel gear interacting through a respective friction ring with one or a plurality of oppositely directed output bevel gears oriented to be axially parallel with the input bevel gear and having their outer surface at a constant spacing from said input bevel gear. The friction rings are displaceable along a respective one of the gaps through a common frame so that a transmission ratio may be continuously varied between the input bevel gear and the output bevel gears. The respective ones of the driven members of the driven bevel gears are connected to the planet wheels of a planetary gear so that a torque applied by the input bevel gear is distributed to the respective ones of the driven bevel gears and added up again through the planetary gear, a constant rpm of the planet wheels and of the driven bevel gears being enforced by coupling the planet wheels. Although this arrangement solves the problem arising with such type bevel friction ring gears as well as with other continuously variable transmissions (CVT), which is that at high torques the continuous variability causes slippage that can only be prevented from occurring with high press-on forces and the resulting losses in efficiency. It however involves the major problem that the smallest manufacturing tolerances or inaccuracies will result in ulterior friction losses.

SUMMARY OF THE INVENTION

It is therefore the object of the present invention to provide a continuously variable transmission that is capable of transmitting higher torques with low losses while providing operational safety.

The solution proposed by the invention is a continuously variable transmission having at least two continuously variable transmission parts that are parallely disposed in a gear train, said transmission being characterized in that the two continuously variable transmission parts are connected through a pick-off gear to an input and an output member respectively.

The use of a pick-off gear, which is also referred to as an overriding gear, offers the advantage that identical rpm or exactly determined rpm is not enforced for one of the gear members of the transmission parts, as it is the case in the state of the art. Instead, the two transmission parts provide their own rpm-dependent share in the resulting rpm of the pick-off gear. Accordingly, the arrangement of the invention permits to separately actuate and regulate the two transmission parts, thus exploiting the advantages resulting from decomposing a continuously variable transmission into two continuously variable transmission parts such as by dividing the torque between the two transmission parts without the trade-off of friction losses or increased regulation expense resulting from an enforced rpm for example.

The actually asymmetric and, as a result thereof, free connection of the two transmission parts via the pick-off gear accordingly offers unexpected advantages in terms of design and use of the transmission, more specifically in terms of efficiency as well as with regard to the demands placed on control which is not possible if the connection exhibits the symmetry enforced by coupling the planet wheels of a planetary gear.

Typically, a pick-off gear of the invention includes for example planetary gears in which two of the three gear components (planet wheels, sun wheel and outer crown gear) are connected to the two transmission parts and the third gear member is used as the driven or driving gear, with the planet wheels being used together as one gear member, or a differential in which the two transmission parts are connected to one of the differentiating members of the differential.

The two continuously variable transmission parts may comprise a common gear member on their side turned away from the pick-off gear. Said common gear member can be a common input shaft or a common output shaft. It may more specifically be a direct gear member of the two continuously variable gears used conjointly by both transmission parts. In the case of bevel friction ring gears for example, one of the bevel gears is suited to be used as the common gear member. Thanks to such a design, a transmission of this type is of a quite compact and low cost construction since the total number of elements of the corresponding transmission can be minimized by the double use thereof.

As used herein, the term "the side turned away from the pick-off gear" designates a direction in the gear train that is defined by the flow of forces through the transmission and must not necessarily coincide with the geometrical or spatial conditions.

A great number of continuously variable transmissions comprise a main transmission plane in which the most important structural components such as input and output shaft, input and output bevel gears or similar bodies exhibiting rotational symmetry are disposed, thus defining a transmission plane. A transmission of the invention is of a particularly compact construction if the two main transmission planes of the two transmission parts are parallel to each other. If the two transmission part planes are identical, a particularly flat construction can be achieved. A transmission of the invention designed in this manner is extremely flat and is furthermore capable of complying with quite high torques. Inter alia, such a transmission is particularly suited for small trucks with diesel engines because it is designed to have an overall size particularly well suited for fastening below a cargo bed and is furthermore capable of readily complying with the high torques of modern diesel engines.

Furthermore, a further variable transmission part, such as more specifically a clutch or a reverse gear, may be provided between at least one of the continuously variable transmission parts and the pick-off gear. Such an arrangement permits to realize transmissions having very wide drive behaviour, more specifically with the possibility of providing a continuous forward and reverse drive. It is more specifically possible to feed back such a transmission onto itself in such a manner when the drive gear is running that the driven gear stops without any torque being applied.

Although the present invention considerably increases the efficiency of the overall transmission over prior art transmissions, continuously variable transmissions still exhibit quite high losses, more specifically under relatively constant operating conditions as they occur for example after starting or on a country road or a highway. In order to avoid such losses, more specifically under operating conditions in which a continuously variable transmission is not absolutely necessary, it is advantageous if at least one of the continuously variable transmission parts may be bypassed. Under the afore mentioned operating conditions, the continuously variable transmission part with its quite high losses can thus be bypassed so that the efficiency is increased under these operating conditions.

BRIEF DESCRIPTION OF THE DRAWINGS

Further advantages, objects and properties of the present invention will become apparent from the following description of the appended drawing. In the drawing:

FIG. 5 shows a clutch as shown in FIG. 4 with additional shifting possibilities and FIG. 6 shows an alternative transmission part, more specifically for the embodiments as shown in the FIGS. 1 through 4.

DETAILED DESCRIPTION OF THE DRAWINGS

Figure 1:
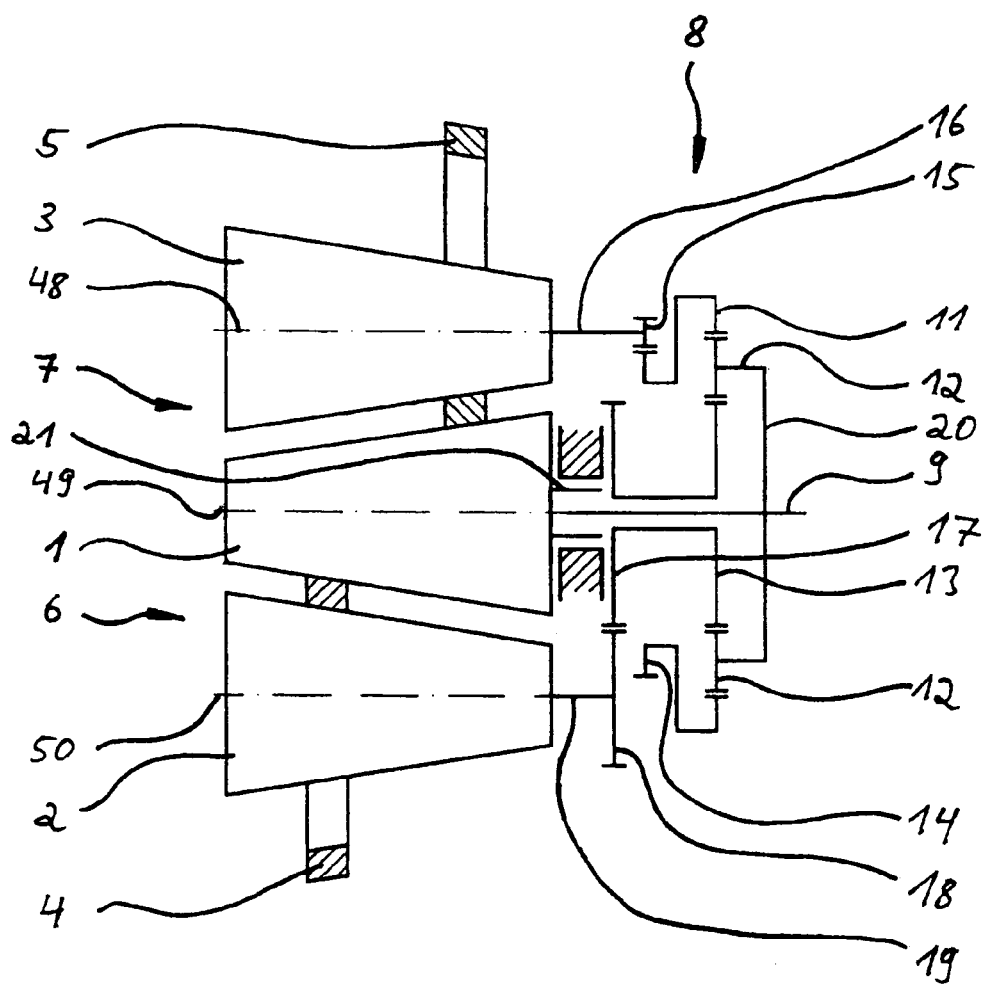
FIG. 1 is a schematic view of a first transmission of the invention.

The continuously variable transmission illustrated in FIG. 1 comprises one input bevel gear 1 and two output bevel gears 2, 3 that are each coupled to the input bevel gear 1 via friction rings 4, 5 revolving about the respective one of the output bevel gears 2, 3. By displacing the friction rings 4, 5 along the gaps left between the bevel gears 1, 2, 3, the transmission parts 6 and 7 can be varied continuously through the bevel gears 1 and 2 and 1 and 3 respectively.

On the output side, the two transmission parts 6, 7 or rather the two output bevel gears 2, 3 are connected to an output shaft 9 via a pick-off gear 8. In the exemplary embodiment illustrated in FIG. 1, the pick-off gear 8 includes a planetary gear with an outer crown gear 11, planet wheels 12 and one sun wheel 13. The outer crown gear 11 is firmly connected to another crown gear 14 which in turn meshes with a pinion 15 disposed on the driven shaft 16 of the bevel gear 3. Likewise, the sun wheel 13 is firmly connected to a wheel 17 and revolves together with the latter which in turn meshes with a pinion 18 disposed on the driven shaft 19 of the bevel gear 2. The planet wheels 12 are further carried in a frame 20 that is connected to the driven shaft 9 and revolves together with the driven shaft 9 and the planet wheels 12. A pick-off gear 8 is thus provided in which the rpm of the pinions 15, 18 and of the driven bevel gears 2, 3 are added to the total rpm of the shaft 9 depending on the transmission ratio and on the position of the friction rings 4, 5. The transmission ratios are preferably chosen so that the planet wheels 12 stop rotating on themselves in the frame 20 and only revolve together with the outer crown gear 11 and the sun wheel 13 when the friction rings 4, 5 are in an identical position, meaning when the two driven bevel gears 2, 3 have the same rpm. Losses occurring in particular in continuous operation may thus be minimized. A coupling 21 by means of which the driven shaft 9 can be connected to the drive bevel gear 1 either directly or, according to a concrete embodiment, via a step-up gear, further serves to minimize losses so that the two transmission parts 6, 7 may be bypassed more specifically at high or relatively uniform speeds at which the advantages of a continuously variable transmission cannot be exploited anyway and at which such type continuously variable transmissions result in unnecessary losses.

As is evident, the pick-off gear 8 adds up the rpm of the two bevel gears 2, 3 and for the rest serves as a torque balance for the torques applied on this bevel gear 2, 3.

Figure 2:
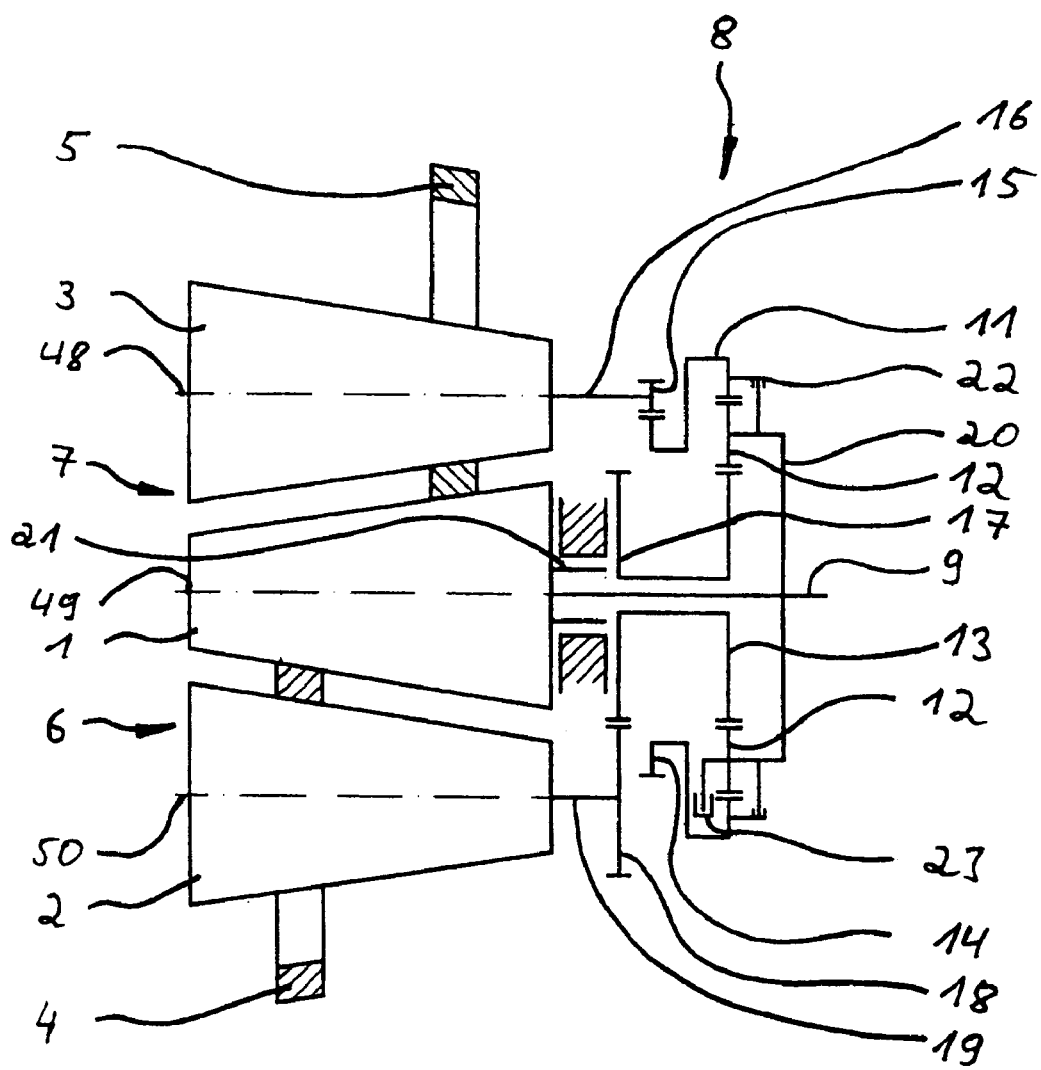
FIG. 2 shows a transmission of the invention according to FIG. 1 with additional shifting possibilities.

The exemplary embodiment illustrated in FIG. 2 substantially corresponds to the exemplary embodiment of FIG. 1 so that identically operating structural components are identified with the same reference number and identical functionalities will not be repeated. As compared to the exemplary embodiment of FIG. 1, the exemplary embodiment of FIG. 2 further comprises on the one side a locking clutch 22 by means of which the revolving frame 20 of the planet wheels 12 can be fixed to the outer crown gear 11 and on the other side a coupling 23 by means of which the frame 20 and the driven shaft 9 may be fixed to a stationary coupling housing that has not been illustrated in further detail herein. The first clutch 22 serves to force the planet wheels 12 to stop rotating on their own axis under given operating conditions so that losses through the planet wheels 12 are avoided and the housing 20 and the shaft 9 revolve together with the outer crown gear 11 and the sun wheel 13. The second coupling 23 serves to keep the planet wheels 12 stationary but rotatable about their own axis. This arrangement is more specifically provided for cooperating with a transmission that is designed in such a manner that the outer crown gear and the sun wheel 13 are capable of revolving in opposite directions or do revolve in opposite directions. This may for example be realized through an additional interposed gearwheel or through a separate reverse gear in the gear train between at least one of the transmission parts 6, 7 and the pick-off gear 8. With such an arrangement, the pick-off gear 8 can be actuated through the two transmission parts 6, 7 so as to obtain an rpm of 0 on the shaft 9 even though the drive bevel gear 1 rotates. In this condition, the coupling 23 can be used to fix the transmission. With such an arrangement, the driven shaft 9 may be started by merely displacing the friction rings 4, 5 or by displacing the transmission parts 6, 7.

Figure 3:
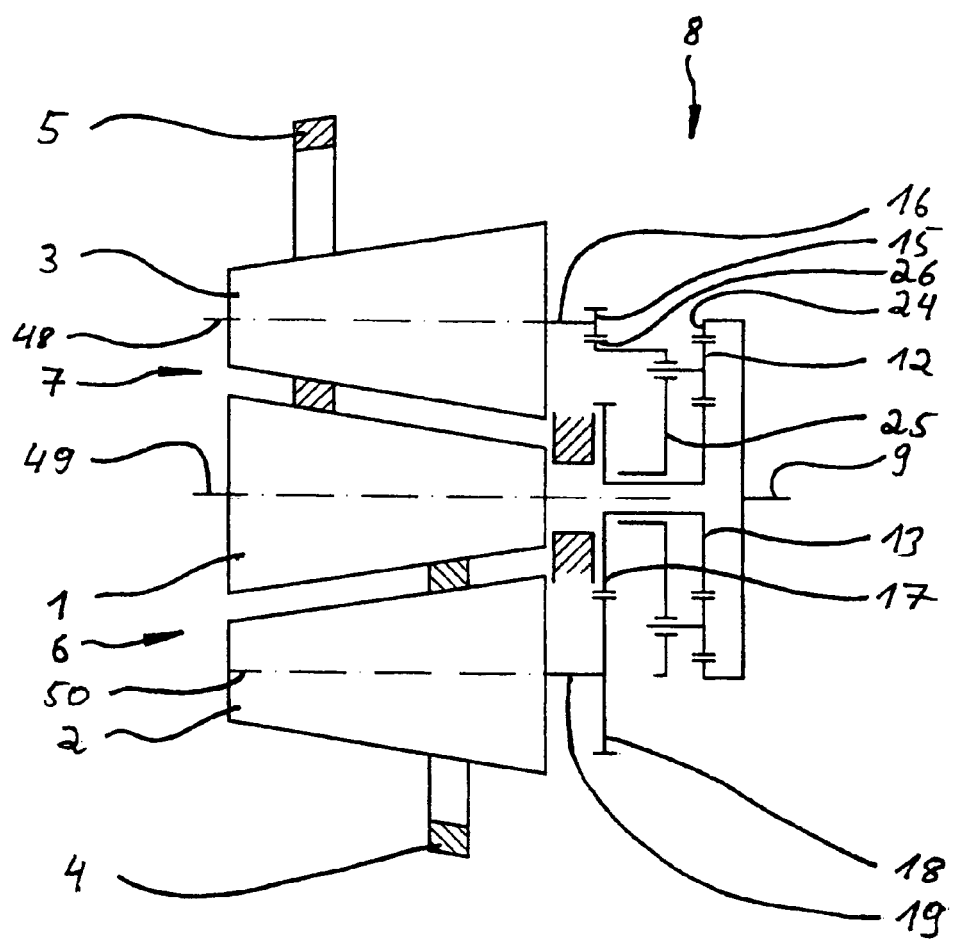
FIG. 3 shows a second clutch of the invention illustrated in an illustration similar to those in the FIGS. 1 and 2.

The arrangement illustrated in FIG. 3 also substantially corresponds to the arrangement shown in FIG. 1. Inasmuch, the transmission parts 6, 7 are identical in the two arrangements. As compared to the arrangement shown in FIG. 1, the pick-off gear 8 of the arrangement of FIG. 3 however has a different design. For this reason, the coinciding component parts and their functioning will not be described in detail here either.

In the continuously variable transmission illustrated in FIG. 3, the driven shaft 9 is directly connected to an outer crown gear 24 of a planetary gear and revolves together therewith. The planet wheels 12 are moreover carried in a frame 25 capable of revolving together with the planet wheels 12 and a wheel 26, said wheel 26 meshing with the pinion 15 on the driven shaft 6 of the bevel gear 3. By contrast, the sun wheel 13 is connected to a wheel 17 that meshes with the pinion 18 on the driven shaft 19 of the bevel gear 2 like in the exemplary embodiments shown in the FIGS. 1 and 2.

The transmission 8 shown in FIG. 3 also acts as a pick-off gear and adds or subtracts the rpm of the two transmission parts 6, 7.

Figure 4:
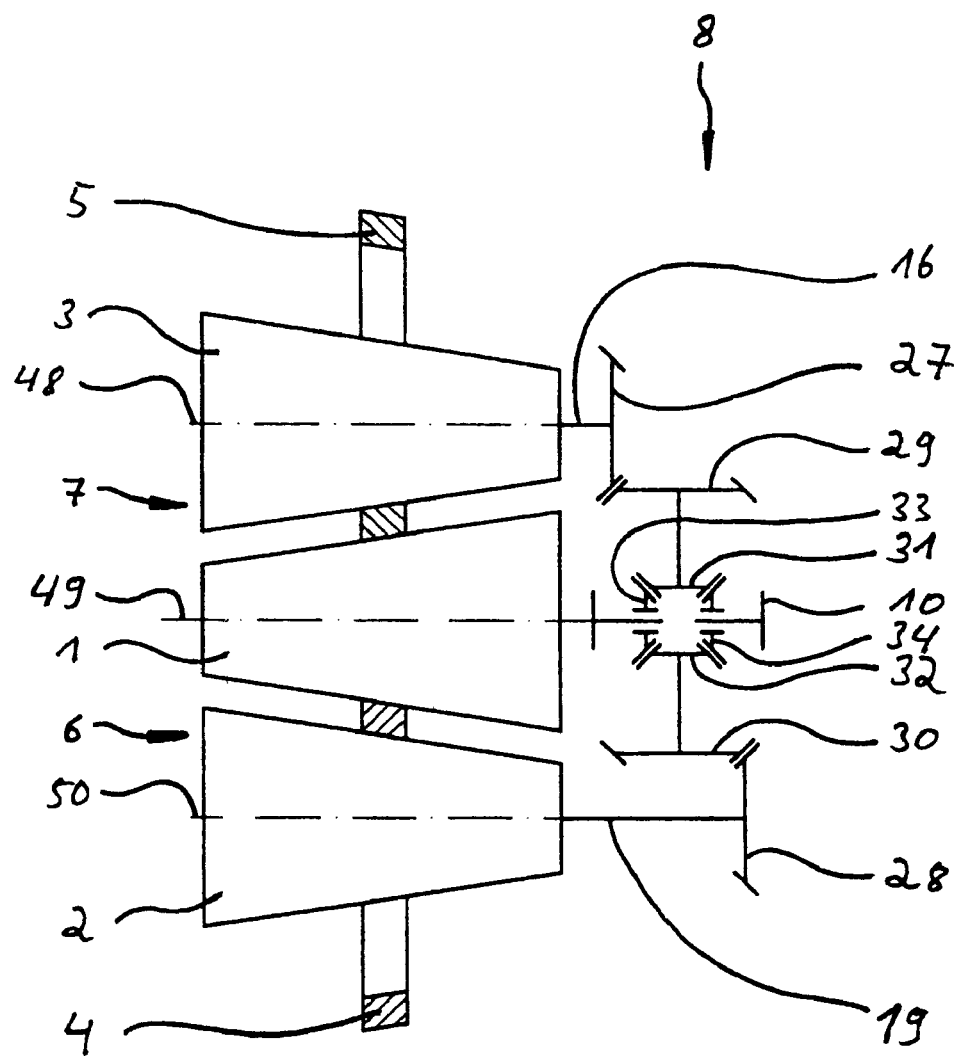
FIG. 4 shows a third clutch of the invention.

With regard to its transmission parts 6, 7, the arrangement illustrated in FIG. 4 corresponds to the arrangements illustrated in the FIGS. 1 through 3. Essentially, only the transmission 8 is of a different design. The pick-off gear 8 is hereby driven through respective bevel gears 27 and 28 that are disposed on a respective one of the driven shafts 16 and 19 of the bevel gears 3 and 2 respectively. For this purpose, the bevel gears 27 and 28 mesh with a respective one of the bevel gears 29 and 30 which in turn are connected to the stationary bevel gears 31 and 32 of the differential that are rotating on their own axis. The transmission of FIG. 4 is driven by a gearwheel 10 that is connected to the journal bearings of the respective revolving bevel gears 33 and 34 which in turn mesh with the respective bevel gears 31 and 32 of the differential. As is evident, this arrangement provides for a pick-off gear as well.

Figure 5:
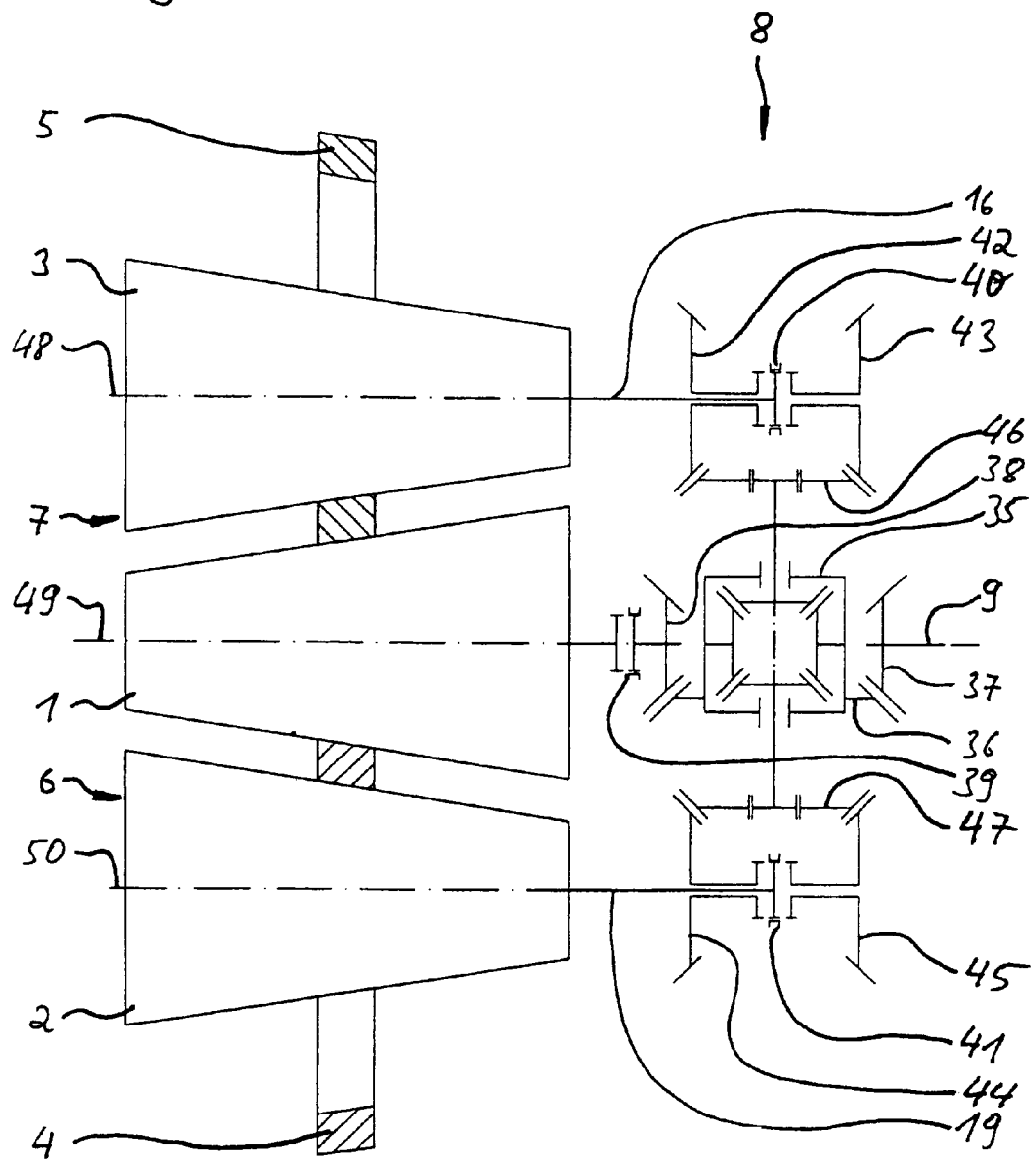

The exemplary embodiment of FIG. 5 corresponds in its basic structure to the exemplary embodiment of FIG. 4 so that again the pick-off gear 8 is substantially formed by a differential 35 that drives the driven shaft 9 with a driven wheel 36 via a bevel gear 37. Moreover, the driven wheel 36 meshes with a bevel gear 38 which in turn is connectable to the drive bevel gear 1 via a synchronized clutch 39 so that the two transmission parts 6, 7 can be bypassed when the need arises. Moreover, in this arrangement, the driven shafts 16, 19 of the driven bevel gears 2, 3 are selectively shiftable, via synchronized clutches 40 and 41, to bevel gears 42, 43 and 44, 45 respectively which in turn mesh with bevel gears 46 and 47 that are connected to the bevel gears of the differential, each of which revolve about a stationary axis. The clutches 40 and 41 thus permit to readily change the efficient direction of rotation of the transmissions parts 6, 7 so that the transmission shown in FIG. 5 comprises a very versatile behaviour.

It is understood that rather than the bevel friction ring gears 6, 7 other continuously variable transmissions could be advantageously used as transmission parts for such type continuously variable transmissions of the invention. As is evident from the FIGS. 1 through 5, the transmission parts 6, 7, which are defined by a respective one of the bevel gear axes 48, 49, 50 that are oriented to be parallel to each other, comprise transmission part planes that are all lying in the plane of the drawing. In this fashion, these transmissions are all very flat and are particularly suited for use in trucks or small trucks because they may for example be provided below a cargo bed. This suitability all the more applies since, using two transmission parts, the transmissions of the invention operate with high efficiency even at higher torques like those applied by modern diesel engines because extremely high press-on forces can be prevented from occurring when using two transmission parts.

As already denoted in the specification and the exemplary embodiments shown in the FIGS. 1 through 4 and explained by way of example with reference to the exemplary embodiment shown in FIG. 5, the characteristics of the overall transmission can be significantly influenced by selecting the directions of rotation in which the transmission parts 6, 7 act onto the pick-off gear 8. In this respect, reverse gears or transmission parts that change the direction of rotation introduce a particular effect of benefit. An alternative thereto is explained by way of example in FIG. 6 for a transmission part including two bevel gears 51 and 52 that interact together through a ring 53. The bevel gear 52 comprises, beside a normal bevel gear region (D), a region (R) revolving in the opposite direction, which in this exemplary embodiment is implemented by a conical ring 54 revolving about planet wheels 55 which in turn are firmly carried in the gear housing 56 and the inner faces of which run on a bevel gear shaft 57 of the bevel gear 52. In this fashion, the conical ring 54 rotates in a direction counter to the direction in which the remaining part of the bevel gear 52 rotates. Furthermore, the bevel gear 52 comprises a neutral region (N) comprising a ring 58 that in turn is carried on the bevel gear shaft 57 so as to be free to rotate.

With this arrangement, the friction ring 53 can be first displaced from the main region (D) of the bevel gear 52 into the neutral region (N), the conical ring 58 matching rotation with the main bevel gear 52 and the friction ring 53. If the friction ring 53 is further displaced in the direction of the region (R) running in the reverse direction, it leaves the main region (D) on the other side so that the direction of rotation of the neutral region (N) can be matched with the direction of rotation of the ring 54 running in the reverse direction. A very compact reverse gear is thus realized.

It is understood that in the transmissions illustrated in the FIGS. 1 through 6 the flow of forces may also be chosen to flow in the opposite direction so that the output members 9, 10 could serve as input members and the input bevel gear 1 as the output bevel gear.

The invention claimed is:

1. A continuously variable transmission comprising:
    a) a first continuously variable transmission (6) comprising a first output bevel friction ring gear (2);
    b) a second continuously variable transmission (7) comprising a second output bevel friction ring gear (3);
    c) a central input bevel gear (1) disposed between said first output bevel friction ring gear (2) and said second output bevel friction ring gear (3), wherein said first continuously variable transmission (6), said second continuously variable transmission (7) and said central input bevel gear (1) are disposed parallel to one another in a gear train;
    d) a first displaceable friction ring (4) coupling said first output bevel friction ring gear (2) to said central input bevel gear (1);
    e) a second displaceable friction ring (5) coupling said second output bevel friction ring gear (3) to said central input bevel gear(1); and
    f) a pick-off gear (8) coupling said first continuously variable transmission (6), said second continuously variable transmission (7) and an output member (9, 10).

2. The continuously variable transmission as set forth in claim 1, wherein said first continuously variable transmission (6) comprises a first output shaft axis (50), said second continuously variable transmission (7) comprises a second output shaft axis (48) and said central input bevel gear (1) comprises an input shaft axis (49), said first output shaft axis (50), said second output shaft axis (48) and said input shaft axis (49) being arranged substantially parallel to one another in a plane of the transmission.

3. The continuously variable transmission as set forth in claim 2, wherein said first continuously variable transmission (6) is arranged in a first plane and said second continuously variable transmission (7) is arranged in a second plane, said first plane being parallel to said second plane.

4. The continuously variable transmission as set forth in claim 3, wherein said first plane is identical to said second plane.

5. The continuously variable transmission as set forth in claim 1, wherein said first continuously variable transmission (6) and said second continuously variable transmission (7) are coupled to a common output shaft (9).

6. The continuously variable transmission as set forth in claim 1, further comprising a further variable transmission part (21, 39, 40, 41) disposed between said pick-off gear (8) and at least one of said first continuously variable transmission (6) and said second continuously variable transmission (7).

7. The continuously variable transmission as set forth in claim 6, wherein said pick-off gear (8) comprises at least one fixable gear member (12, 20).

8. The continuously variable transmission as set forth in claim 6, wherein said further variable transmission part comprises a clutch.

9. The continuously variable transmission as set forth in claim 6, wherein said further variable transmission part comprises a reverse gear.

10. The continuously variable transmission as set forth in claim 1, wherein at least one of said first continuously variable transmission (6) and said second continuously variable transmission (7) is bypassable (21, 39).

11. A continuously variable transmission comprising:
   a) a first continuously variable transmission (6) comprising a first input bevel friction ring gear (2);
   b) a second continuously variable transmission (7) comprising a second input bevel friction ring gear (3);
   c) a central output bevel gear (1) disposed between said first input bevel friction ring gear (2) and said second input bevel friction ring gear (3), wherein said first continuously variable transmission (6), said second continuously variable transmission (7) and said central output bevel gear (1) are disposed parallel to one another in a gear train;
   d) a first displaceable friction ring (4) coupling said first input bevel friction ring gear (2) to said central output bevel gear (1);
   e) a second displaceable friction ring (5) coupling said second input bevel friction ring gear (3) to said central output bevel gear (1); and
   f) a pick-off gear (8) coupling said first continuously variable transmission (6), said second continuously variable transmission (7) and an input member (9, 10).

12. The continuously variable transmission as set forth in claim 11, wherein said first continuously variable transmission (6) comprises a first input shaft axis (50), said second continuously variable transmission (7) comprises a second input shaft axis (48) and said central output bevel gear (1) comprises an output shaft axis (49), said first input shaft axis (50), said second input shaft axis (48) and said output shaft axis (49) being arranged substantially parallel to one another in a plane of the transmission.

13. The continuously variable transmission as set forth in claim 12, wherein said first continuously variable transmission (6) is arranged in a first plane and said second continuously variable transmission (7) is arranged in a second plane, said first plane being parallel to said second plane.

14. The continuously variable transmission as set forth in claim 13, wherein said first plane is identical to said second plane.

15. The continuously variable transmission as set forth in claim 11, wherein said first continuously variable transmission (6) and said second continuously variable transmission (7) are coupled to a common input shaft.

16. The continuously variable transmission as set forth in claim 11, further comprising a further variable transmission part (21, 39, 40, 41) disposed between said pick-off gear (8) and at least one of said first continuously variable transmission (6) and said second continuously variable transmission (7).

17. The continuously variable transmission as set forth in claim 16, wherein said pick-off gear (8) comprises at least one fixable gear member (12, 20).

18. The continuously variable transmission as set forth in claim 16, wherein said further variable transmission part comprises a clutch.

19. The continuously variable transmission as set forth in claim 16, wherein said further variable transmission part comprises a reverse gear.

20. The continuously variable transmission as set forth in claim 11, wherein at least one of said first continuously variable transmission (6) and said second continuously variable transmission (7) is bypassable (21, 39).

* * * * *

UNITED STATES PATENT AND TRADEMARK OFFICE
CERTIFICATE OF CORRECTION

PATENT NO.       : 7,654,930 B2                                              Page 1 of 1
APPLICATION NO. : 10/541448
DATED            : February 2, 2010
INVENTOR(S)      : Rohs et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 757 days.

Signed and Sealed this

Twenty-third Day of November, 2010

David J. Kappos
*Director of the United States Patent and Trademark Office*